United States Patent
Hornbeck

(12) 
(10) Patent No.: US 6,323,982 B1
(45) Date of Patent: Nov. 27, 2001

(54) YIELD SUPERSTRUCTURE FOR DIGITAL MICROMIRROR DEVICE

(75) Inventor: Larry J. Hornbeck, Van Alstyne, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/309,745

(22) Filed: May 11, 1999

Related U.S. Application Data

(60) Provisional application No. 60/086,453, filed on May 22, 1998.

(51) Int. Cl.$^7$ .................................................. G02B 26/08
(52) U.S. Cl. ........................ 359/224; 359/223; 359/900; 359/198
(58) Field of Search ..................................... 359/223, 224, 359/290–291, 295, 298, 198, 900

(56) References Cited

U.S. PATENT DOCUMENTS

| | | |
|---|---|---|
| 5,096,279 | 3/1992 | Hornbeck et al. . |
| 5,447,600 | 9/1995 | Webb ........................................ 216/2 |
| 5,907,425 * | 5/1999 | Dickensheets et al. ............. 359/224 |

OTHER PUBLICATIONS

Application No. 08/311,480 filed Sep. 23, 1994.
Application No. 08/483,777 filed Jun. 7, 1995.

* cited by examiner

*Primary Examiner*—James Phan
(74) *Attorney, Agent, or Firm*—Charles A. Brill; Wade James Brady, III; Frederick J. Telecky, Jr.

(57) ABSTRACT

A high-yield micromirror device and fabrication method. Address electrodes (310) and a separate mirror bias/reset conductor (312) are disposed on a substrate (304). A micromirror superstructure including torsion beam support posts (116), torsion beam hinges (120), a torsion beam yoke (114), a mirror support post (326), and a mirror (102) is fabricated above, and electrically connected to, the mirror bias/reset conductor (312) such that the torsion beam yoke (114) and mirror (102) are suspended above the address electrodes (310). A dielectric layer (328) is formed over the address electrodes (310). The dielectric layer (328), coupled with the elimination of upper address electrodes used in the prior art electrically insulates the address electrodes (310) from contact with the mirror superstructure and prevents conductive debris from shorting either the mirror superstructure or mirror bias/reset conductor (312) to the address electrodes (310).

30 Claims, 7 Drawing Sheets

YIELD SUPERSTRUCTURE FOR DIGITAL MICROMIRROR DEVICE

CROSS-REFERENCE TO RELATED APPLICATIONS

This application claims priority under 35 USC §119(e)(1) of provisional application No. 60/086,453 filed May 22, 1998.

The following patents and/or commonly assigned patent applications are hereby incorporated herein by reference:

| Patent No. | Filing Date | Issue Date | Title |
|---|---|---|---|
| 5,096,279 | Nov. 26, 1990 | Mar. 17, 1992 | Spatial Light Modulator And Method |
| 5,583,688 | Dec. 21, 1993 | Dec. 10, 1996 | Multi-Level Digital Micromirror Device |

FIELD OF THE INVENTION

This invention relates to the field of micromechanical devices, more particularly to digital micromirror devices.

BACKGROUND OF THE INVENTION

Micromechanical devices are small structures typically fabricated on a semiconductor wafer using techniques such as optical lithography, metal sputtering, plasma oxide deposition, and plasma etching which have been developed for the fabrication of integrated circuits.

Digital micromirror devices (DMDs), sometimes referred to as deformable mirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator which uses digital image data to modulate a beam of light by selectively reflecting portions of the beam of light to a display screen. While analog modes of operation are possible, DMDs are typically operated in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics were used to illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer bent downward over the length of the flap or cantilever when attracted by the underlying address electrode, creating a curved surface. The curved surface scattered incident light—lowering the contrast ratio of images formed with flap or cantilever beam devices.

Torsion beam devices were developed to improve the image contrast ratio by concentrating the deformation on a relatively small portion of the DMD surface. Torsion beam devices use a thin metal layer to form a torsion beam, which is often referred to as a torsion hinge, and a thicker metal layer to form a rigid member. The thicker rigid member, which is sometimes referred to as a torsion beam or simply a beam, typically has a mirror-like surface. The rigid mirror remains flat while the torsion hinges deform, minimizing the amount of light scattered by the device and improving the contrast ratio of the device.

Recent micromirror configurations, called hidden-hinge designs, further improve the image contrast ratio by using an elevated mirror to block most of the light from reaching the device superstructure. The elevated mirror is connected by a support post to an underlying torsion beam or yoke. The yoke is attached to torsion hinges which in turn are connected to rigid support posts. Because the structures which support the mirror and allow it to rotate are underneath the mirror instead of around the perimeter of the mirror, virtually the entire surface of the device is used to fabricate the mirror. Since virtually all of the light striking a hidden-hinge micromirror device reaches an active mirror surface—and thus either used to form an image pixel or reflected away from the image to a light trap—the hidden-hinge device's contrast ratio is much higher than the contrast ratio of previous devices.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion hinge axis. Digital operation uses a relatively large address voltage to ensure the mirror is fully deflected. The address electrodes are driven using standard logic voltage levels and a bias voltage, typically a positive voltage, is applied to the mirror metal layer to control the voltage difference between the address electrodes and the mirrors. Use of a sufficiently large mirror bias voltage, a voltage above what is termed the threshold voltage of the device, ensures the mirror will fully deflect toward the address electrode—even in the absence of an address voltage. The use of a large mirror bias voltage enables the use of low address voltages since the address voltages need only slightly deflect the mirror prior to the application of the large mirror bias voltage.

To create an image using the micromirror device, the light source is positioned at an angle relative to the device normal equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror rapidly is rotated on and off to vary the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing trough three color filters mounted on a rotating color wheel.

While demand for micromirror-based display systems is created primarily as a result of the superior image quality the systems provide, some market segments are characterized by cost concerns more than image quality concerns. Micromirror devices are produced in bulk on semiconductor wafers and therefore take advantage of the same wafer processing economies of scale which characterize the semiconductor industry. Wafer processing places great emphasis on the wafer yield—the number of working devices produced by each wafer. Therefore, methods of increasing the wafer yield are needed.

SUMMARY OF THE INVENTION

Objects and advantages will be obvious, and will in part appear hereinafter and will be accomplished by the present invention which provides a method and system for a high-yield micromirror device. According to one embodiment of the disclosed invention, a micromirror device is disclosed. The micromirror device comprises a substrate, at least one address electrode and mirror bias/reset conductor supported by the substrate, and a dielectric layer overlying at least one address electrode. A deflectable rigid member is supported over the substrate by a deformable element. In operation, a voltage differential between the address electrode and the rigid member is operable to create an electrostatic attraction between the address electrode and the rigid member thus causing the deflectable rigid member to deflect toward said address electrode.

According to another embodiment of the disclosed invention, a method of forming a micromirror device is disclosed. The method comprises the steps of forming a mirror bias/reset conductor and address electrodes on a substrate, forming a dielectric layer over the address electrodes, and forming a deflectable rigid member supported by the substrate.

According to yet another embodiment of the disclosed invention., a method of forming a micromirror device is disclosed. The method comprises the steps of forming a mirror bias/reset conductor and address electrodes on a substrate, forming a dielectric layer over the address electrodes between the address electrodes and mirror bias/reset conductor, depositing a first spacer layer, depositing at least one metal layer on the first spacer layer, patterning the at least one metal layer to form the support structures, a deformable element, and a hinge yoke, forming a second spacer layer over portions of the first spacer layer not covered by the support structures, the deformable element, and the hinge yoke, depositing a third spacer layer over the second spacer layer, the support structures, the deformable element, and the hinge yoke, opening vias through the third spacer layer to the hinge yoke, and forming micromirrors on the third spacer layer.

The disclosed invention also provides a micromirror device comprising a substrate, a first layer supported by the substrate, a second layer forming a micromirror spaced apart from the first layer, and a third layer disposed between said first layer and said second layer. The third layer is supported by the substrate and in turn supports the second layer. The third layer forms at least one deformable element and at least one hinge yoke, and address electrodes are formed only in said first layer.

The disclosed invention also provides a method of forming a micromirror device, comprising the steps of forming a mirror bias/reset conductor and address electrodes on a substrate, forming a hinge yoke supported above the address electrodes, and forming a micromirror supported by said hinge yoke.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new micromirror architecture has been developed that is capable of greatly increasing device yield, with only a slight increase in the processing steps required to implement the improved architecture. In addition to improving the initial yield of working devices, the disclosed architecture also increases the device's resistance to failures during the operation of the device caused by particle contamination during the operation of the device.

Although the disclosed invention will be discussed primarily in terms of modern hidden-hinge device architectures, this emphasis is solely for the purposes of showing the application of the inventive concepts to the most commercially promising designs. The concepts of the disclosed invention may be applied to all architectures of micromirror designs.

Figure 1:
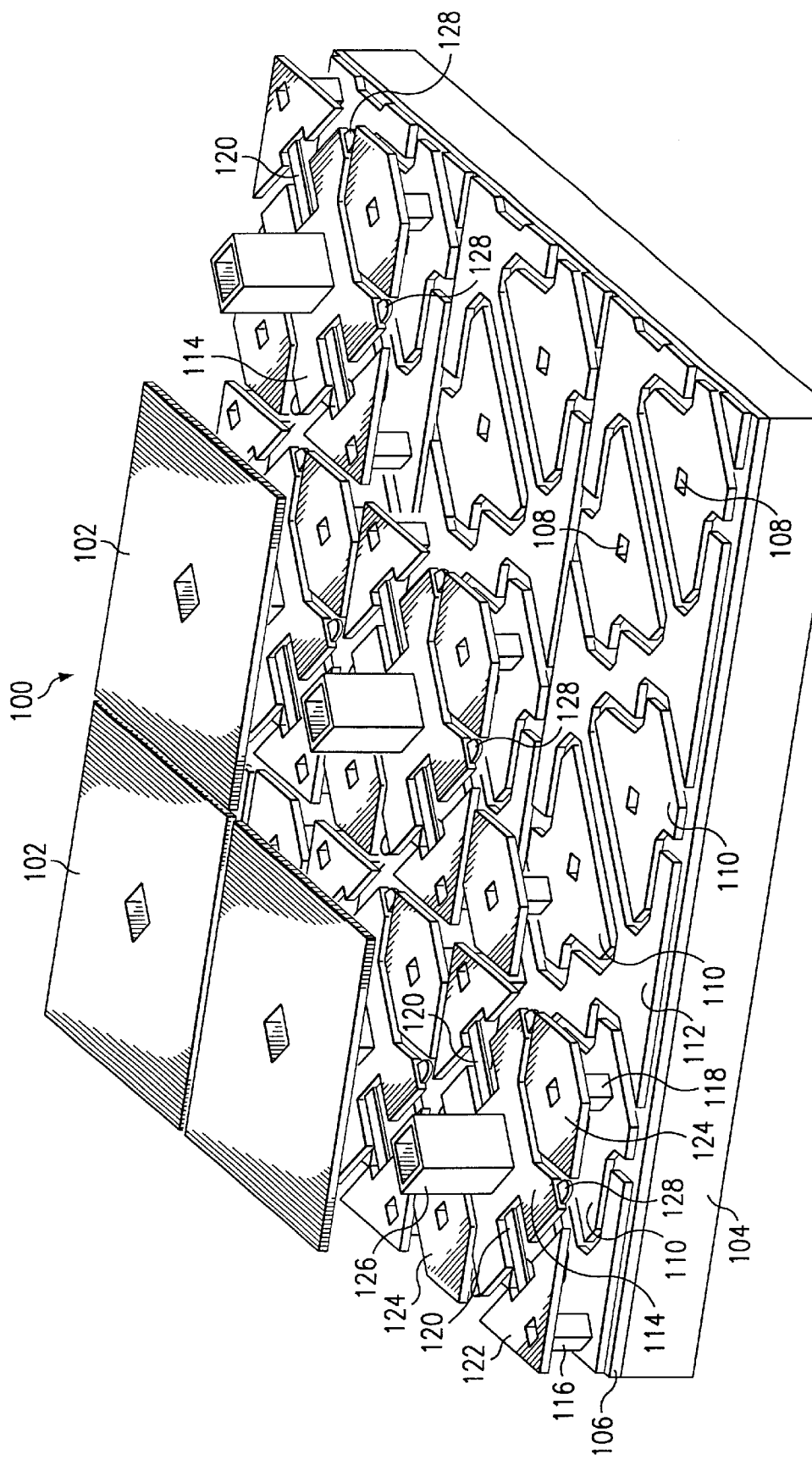
FIG. 1 is a perspective view of a small portion of a micromirror array of the prior art.
Figure 2:
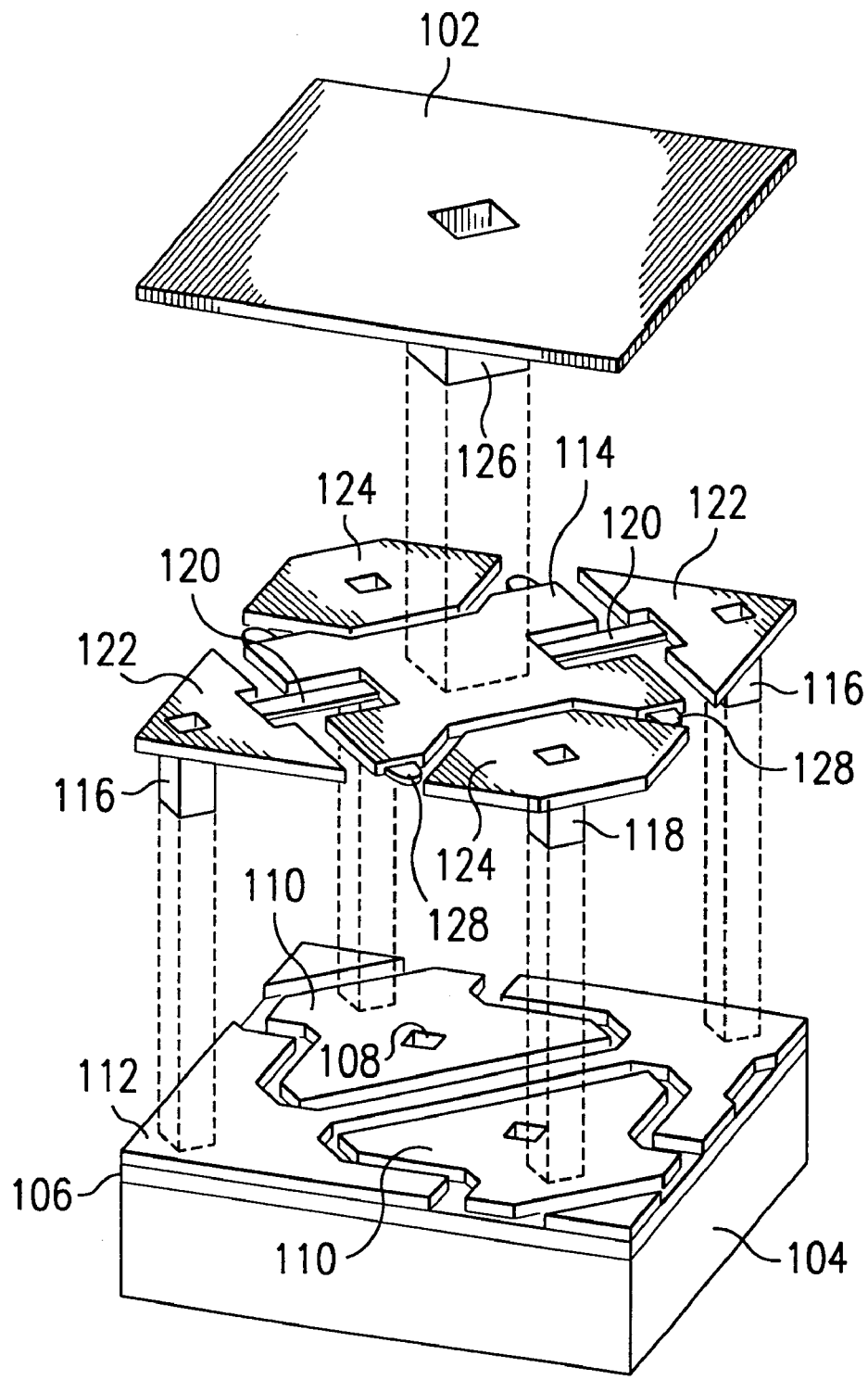
FIG. 2 is an exploded perspective view of a single micromirror element from the micromirror array of FIG. 1.

A typical hidden-hinge DMD 100 is an orthogonal array of DMD cells, or elements. This array often includes more than a thousand rows and columns of DMD cells. FIG. 1 shows a small portion of a DMD array with several mirrors 102 removed to show the underlying mechanical structure of the DMD array. FIG. 2 is an exploded view of a single DMD element further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with and typically underlying each mirror 102, voltage driver circuits to drive bias and reset signals to the mirror superstructure, and digital logic circuits to control the transfer of the digital image data to the underlying memory cells. Data formatting logic could also be formed in the substrate 104. In the past, some DMD configurations used a split reset configuration, also known as memory-multiplexed addressing, which allowed several DMD elements to share one memory cell—thus reducing the number of memory cells necessary to operate a very large array, and making more room available for voltage driver and image processing circuitry on the DMD integrated circuit. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a plasma deposited oxide. This layer is planarized by a chemical/mechanical polish (CMP) to provide an optically flat surface upon which to build the DMD superstructure. Holes or vias 108 are opened in the oxide layer to allow electrical connection of the DMD superstructure with the electronic circuitry formed in the substrate 104. Vias 108 are called Via2 because there is an earlier via layer formed in the underlying electronic circuitry.

The first layer of the superstructure is a metalization layer. Because two metalization layers are typically required to interconnect the circuitry fabricated on the substrate, the first layer of the superstructure is typically the third metalization layer, often called Metal3. The Metal3 metalization layer is deposited on the insulating layer 106 and patterned to form address electrodes 110 and a mirror bias connection 112. The address electrodes 110 are electrically connected to the underlying electronic circuitry through the vias 108.

Due to the voltage potential between the mirror 102 and the address electrodes, contact between the mirror 102 and either the upper or lower address electrodes 124, 110 could fuse the torsion hinges 120 or weld the mirror 102 to the address electrodes—in either case ruining the DMD. Micromirrors are designed to prevent contact between the rotating structure and the address electrodes by keeping the lower address electrodes 110 away from the regions where the rotating structure, including the mirror 102 and the hinge yoke 114 contacts the substrate, and by increasing the elevation of the mirror and shaping the upper address electrodes 124 to minimize interference between the mirror 102 and the upper address electrodes 124.

The regions where the rotating structure, typically hinge yoke 114, contacts the substrate or structures on the substrate are called landing sites. Landing sites mechanically limit the rotation of the mirror 102 or hinge yoke 114. Elastic extensions of the hinge yoke, called spring tips 128, localize contact between the hinge yoke 114 and the landing sites. The landing sites are often coated with a material chosen to reduce the tendency of the mirror 102 and torsion hinge yoke 114 to stick to the landing site. Some micromirror designs have metallized landing sites, called landing electrodes, that are separate and distinct from, but electrically connected to, the mirror bias connection 112. Other micromirror designs pattern the mirror bias connection 112 to include integral landing sites. Since the same voltage is always applied to both the landing sites and the mirrors 102, the mirror bias connection and the landing electrodes are preferably combined in a single structure when possible.

Mirror bias/reset voltages travel to each mirror 102 through the mirror bias/reset conductor, typically a mirror bias/reset metalization layer 112. Some reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the sub-arrays.

A first layer of supports, typically called spacervias, is fabricated on the metal layer forming the address electrodes 110 and mirror bias connections 112. These spacervias, which include both torsion hinge support spacervias 116 and upper address electrode spacervias 118, are typically formed by spinning a thin spacer layer over the address electrodes 110 and mirror bias connections 112. This thin spacer layer is typically a 1 µm thick layer of positive photoresist. After the photoresist layer is soft baked, it is exposed, developed, and deep UV hardened to form holes where the spacervias will be formed. This spacer layer, as well as a thicker spacer layer used later in the fabrication process, are often called sacrificial layers since they are used only as forms during the fabrication process and are removed from the device prior to device operation.

A thin layer of metal, typically an aluminum alloy, is sputtered onto the spacer layer and into the holes. An oxide is then plasma deposited over the thin metal layer and patterned to form etch stops over the regions that later will form torsion hinges 120. A thick layer of metal, typically an aluminum alloy, is sputtered over the thin layer and oxide etch stops. Another layer of oxide is grown and patterned to define the torsion hinge yoke 114, hinge support caps 122 (typically considered part of the hinge support post 116), and the upper address electrodes 124. After this second oxide layer is patterned, the two metals layers are etched simultaneously and the oxide etch stops removed to leave thick rigid torsion hinge yokes 114, hinge support posts 116, upper address electrodes 124, and thin flexible torsion hinges 120.

A thick spacer layer is then deposited over the thick metal layer and patterned to define holes in which mirror support spacervias 126 will be formed. The thick spacer layer is typically a 2.4 µm thick layer of positive photoresist. A thick layer of mirror metal, typically an aluminum alloy, is sputtered on the surface of the thick spacer layer and into the holes in t he thick spacer layer. The thick metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. The upper address electrodes 124 also electrostatically attract the deflectable rigid member. The term deflectable rigid member is used to encompass all of the moveable elements of the device, other than the torsion hinges 120, regardless of the architecture of the device. Depending on the design of the micromirror, the term deflectable rigid member includes the torsion hinge yoke 114, mirror beam 102, both the yoke 114 and mirror beam 102, or a mirror beam attached directly to the torsion hinges. The torsion hinges 120 which support the deflectable rigid member are a deformable member—a term which include s structures enabling other forms of motion such as cantilever hinges.

The force created by the voltage potential is a function of the square of the reciprocal of the distance between the two plates. As the rigid member rotates due to the electrostatic torque, the torsion hinges resist with a restoring torque which is an approximately linear function of the angular deflection of the torsion hinges. The structure rotates until the restoring torsion hinge torque equals the attracting electrostatic torque. As mentioned above, most micromirror devices are operated in a digital mode wherein sufficiently large bias voltages are used to ensure full deflection of the micromirror superstructure.

Figure 3:
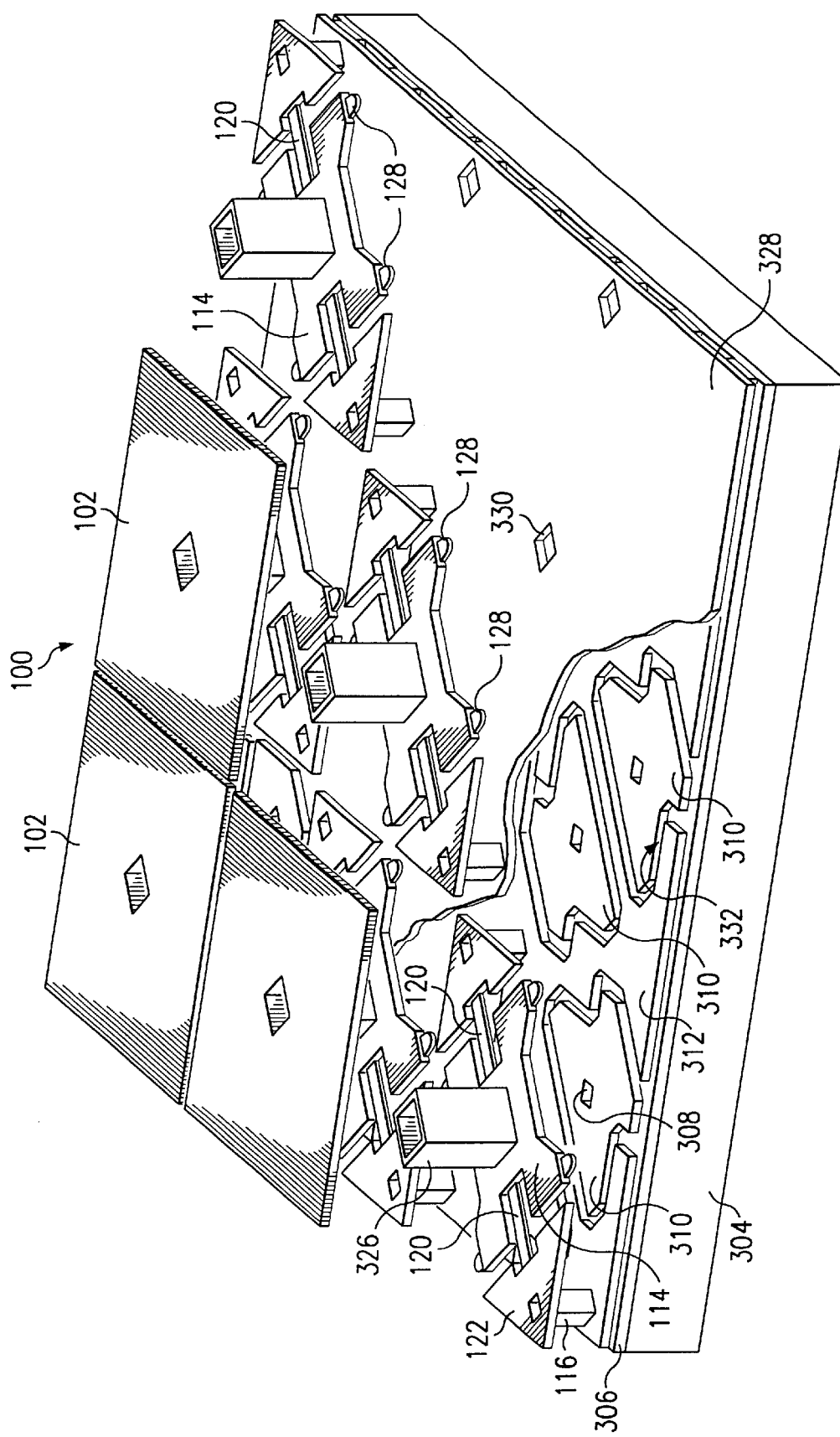
FIG. 3 is a perspective view of a small portion of an improved micromirror array according to one embodiment of the present invention.
Figure 4:
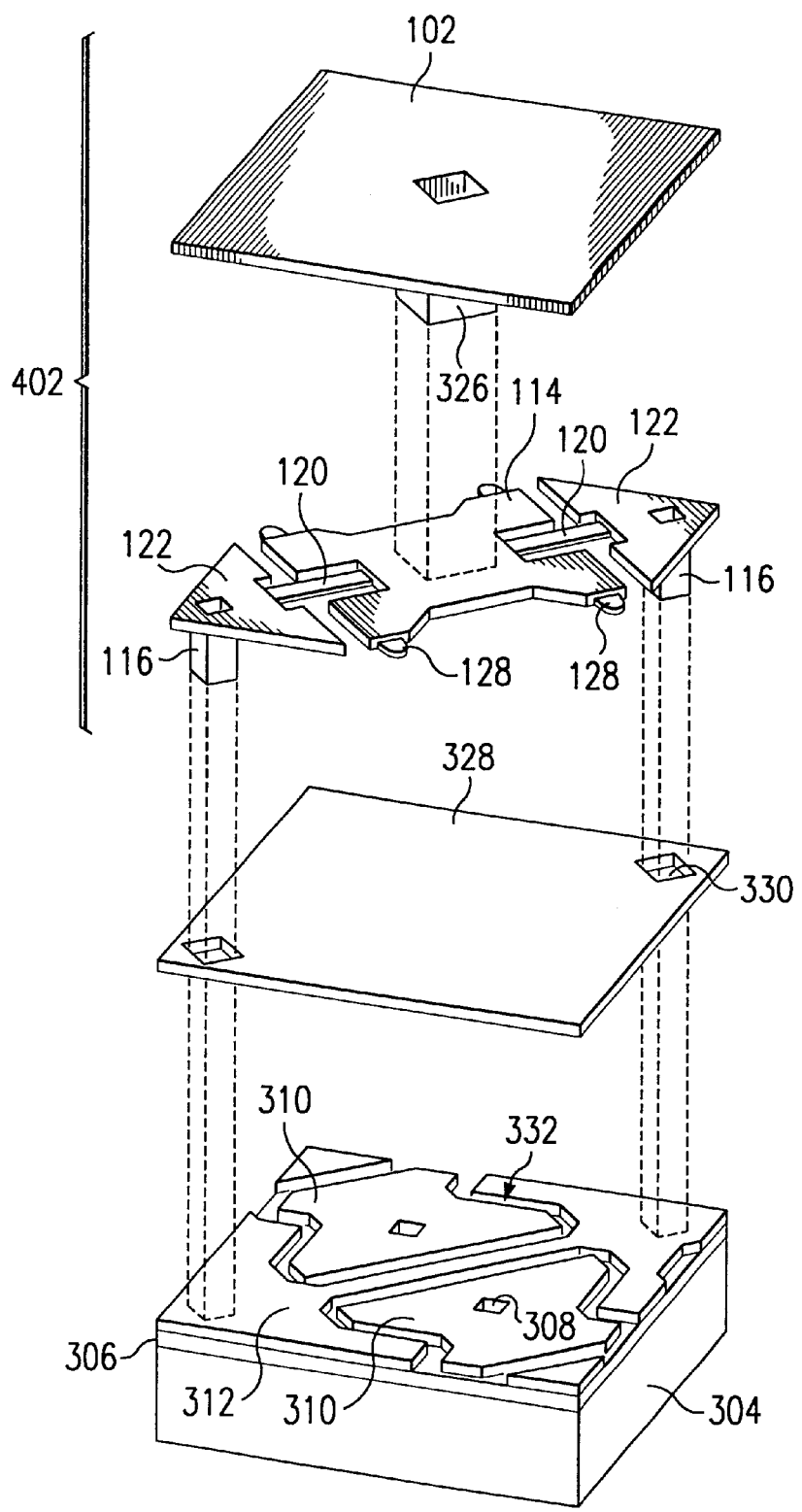
FIG. 4 is an exploded perspective view of a single micromirror element from the micromirror array of FIG. 3.

FIG. 3 is a perspective view of a small portion of a micromirror array according to one embodiment of the disclosed invention. FIG. 4 is an exploded perspective view of the one element or cell of FIG. 3, showing the interrelationship of the various layers in the device.

Fabrication of the dielectrically isolated hidden-hinge micromirror device is similar to previous hidden-hinge fabrication processes through the Via2 formation. This process yields a substrate 304 having electrical circuitry, typically CMOS circuitry, fabricated in the surface, and two layers of metalization sealed by a CMP oxide. The Via2 308 step opens holes in the oxide layer over the second metalization layer to allow the address electrodes of the micromirror to electrically connect to the underlying circuitry.

A third metal layer, Metal3, is sputtered over the CMP oxide and into the Via2 308 openings to the Metal2 layer. Metal3 is typically a 3000 Å thick layer of an aluminum alloy. After depositing Metal3, it is patterned and etched to form a mirror bias/reset structure 312 and address electrodes 310.

After patterning the Metal3 layer, a 0.2 $\mu$m thick layer of oxide is formed over the entire Metal3 layer to form a dielectric insulation layer 328. This oxide layer 328 is typically a plasma oxide, but may be formed by other techniques. This oxide layer 328 acts not only as an insulator to prevent shorts between the micromirror superstructure and the underlying Metal3 layer, but also as a dielectric layer between the address electrode 310 and the torsion hinge yoke 114 and mirror 102. Holes 330 or vias (often called Via3) are opened in the dielectric layer 328 to permit electrical connection of the superstructure to the Metal3 layer.

According to one embodiment of the disclosed invention, shown in FIGS. 3 and 4, rotation of the deflectable rigid member is stopped by contact between the deflectable rigid member and the dielectric insulation layer 328. As the torsion hinge yoke 114 rotates about the torsion hinge axis, spring tips 128 will contact the dielectric insulation layer 328 and stop the rotation of the deflectable rigid member—thus avoiding contact between the torsion hinge yoke 114 and the landing sites on the mirror bias/reset metalization layer 312.

Figure 5:
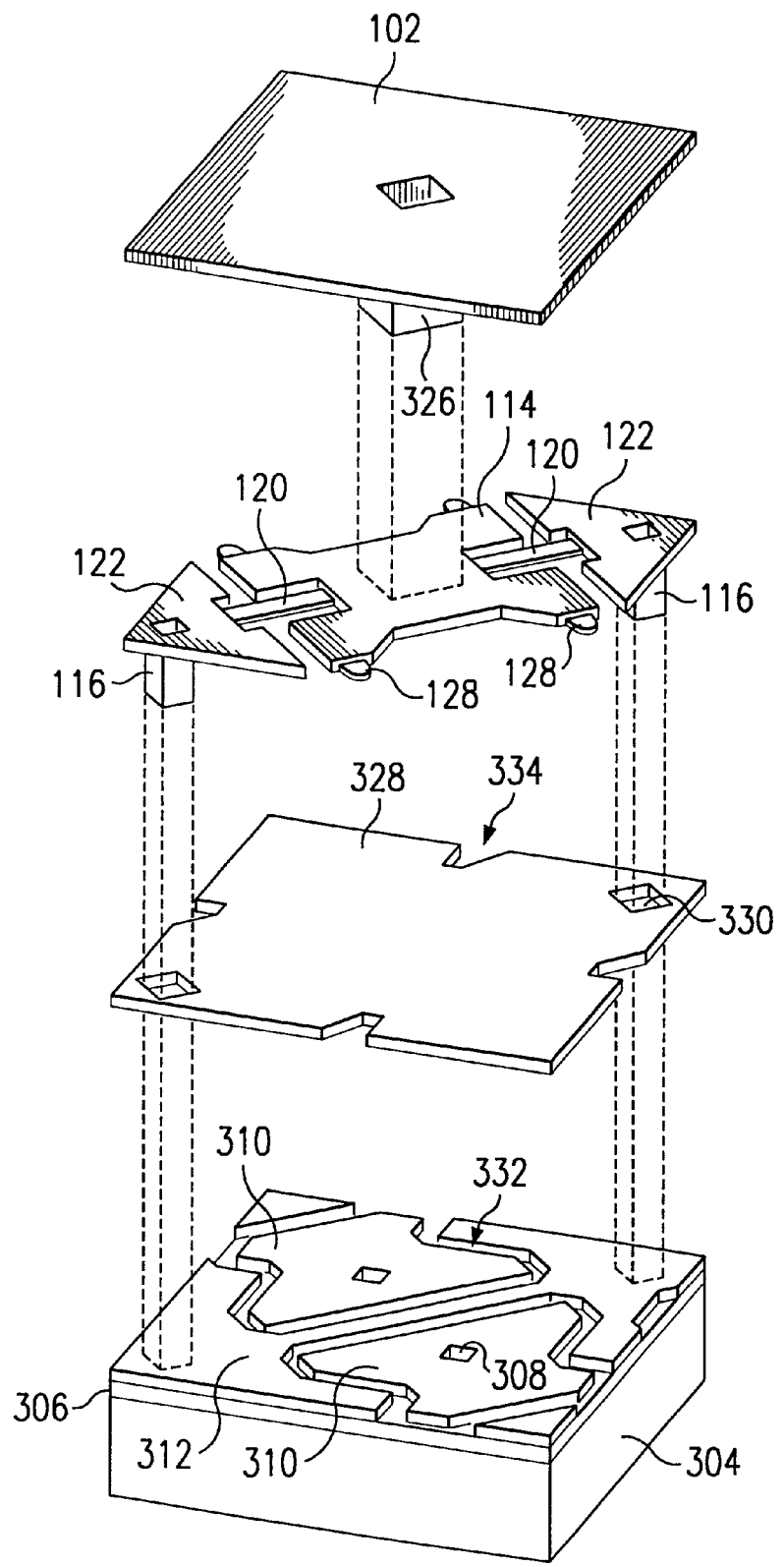
FIG. 5 is an exploded perspective view of a single micromirror element similar to the element of FIG. 4, but with holes in the dielectric layer to allow the torsion hinge yoke to land on the mirror bias/reset metalization layer.

According to a second embodiment of the disclosed invention, shown in FIG. 5, holes 334 are opened through the dielectric isolation layer 328 to allow the spring tips 128 to contact the landing sites on the mirror bias/reset metalization layer 312. The holes shown in FIG. 5 do not expose the address electrodes 310—thus maintaining a high resistance to particulate-caused shorts provided by the dielectric isolation layer 328 without interfering with the traditional means of stopping mirror rotation. The size, shape, and location of the holes 334 shown in FIG. 5 illustrate only one example of many hole patterns which could be used.

According to yet another embodiment of the disclosed invention, only the address electrodes 310 are covered by the dielectric layer 328. Covering only the address electrodes provides protection from electrical short circuits since the exposed mirror bias/reset metalization layer 312 and the mirror superstructure share a common voltage. Portions of the gap 332 between the address electrodes 310 and the mirror bias/reset metalization 312 may also be covered with the dielectric layer 328 to ensure complete coverage of the address electrodes 310.

If the gaps 332 between the address electrodes 310 and the mirror bias/reset metalization layer 312 are 2 $\mu$m or larger, a plasma oxide will not provide a sufficiently planar surface on which to fabricate the remainder of the micromirror device. Height variations in the layers on which the overlying micromirror superstructure is fabricated result in a non-planar micromirror and degrade the image formed by the micromirror device. To provide a planar dielectric layer on which to fabricate the remainder of the device, a plasma oxide layer thicker than 0.2 $\mu$m is formed and planarized using a CMP process. Alternatively, two separate oxide layers are used to provide a planar oxide surface: a first oxide layer deposited and patterned to fill the gaps between the address electrodes 310 and the mirror bias/reset metalization layer 312 and a second oxide layer deposited over the first oxide layer, the address electrodes 310 and the mirror bias/reset metalization layer 312.

Figure 6:
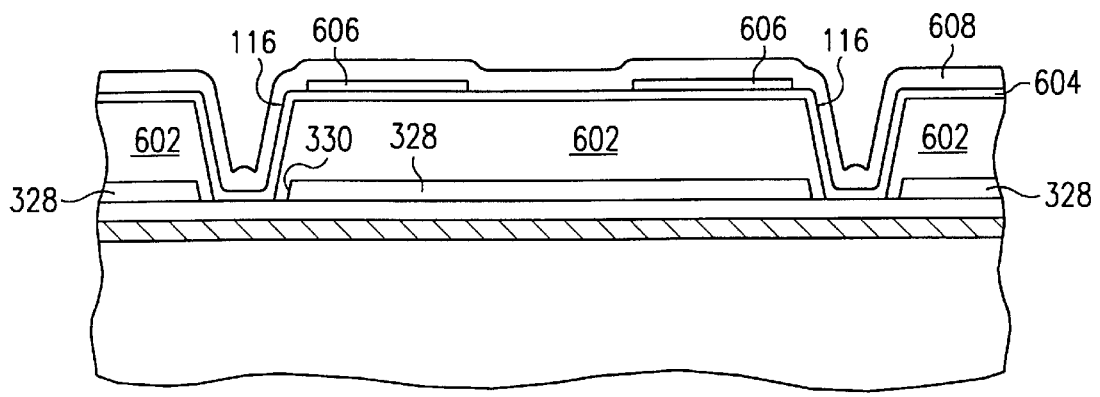
FIG. 6 is a cross-section view along the torsion hinge axis showing a partially fabricated improved micromirror element of FIG. 3 prior to etching the torsion hinges and yoke.

A thick planarizing spacer layer 602, shown in FIG. 6, is formed over the dielectric insulation layer 328. This first spacer layer is typically a 1 $\mu$m thick positive photoresist which is spun onto the substrate wafer. The first spacer layer 602 is then patterned to form vias which will act as forms for the torsion hinge support spacervias 116, and deep UV hardened to prevent bubbling and deformation during later processing steps. The spacervias 116 are nested inside the Via3 330 holes to permit electrical connection between the micromirror superstructure 402 and the mirror bias/reset structure 312.

A layer of torsion hinge metal 604 is sputtered over the first spacer layer and into the spacervias, making electrical contact with the Metal3 layer. The torsion hinge metal layer is typically a 600 Å thick aluminum alloy layer. Oxide torsion hinge etch stops 606 are formed over the regions which will later form the torsion hinges 120, and a second layer of metal 608, typically a 4000 Å thick aluminum alloy layer, is sputtered over the torsion hinge layer and etch stops. Both the first and second metal layers are then etched in a single step to form torsion hinge support posts 116, torsion hinges 120, and yokes 114.

Prior hidden-hinge micromirror designs, shown in FIGS. 1 and 2, used two address electrodes on each side of the torsion hinge axis. A lower address electrode 110 electrostatically attracted the torsion hinge 120 while an upper address electrode 124 electrostatically attracted the mirror 102. The upper address electrode 124 was fabricated at the same level, and during the same process steps, as the torsion hinge supports 116, the torsion hinge support caps 122, the torsion hinge 120, and the torsion hinge yoke 114. The disclosed architecture eliminates the elevated upper address electrodes 124, thus physically and electrically isolating all superstructure components that are biased by address voltages from the components that are biased by mirror bias/reset voltages.

Elimination of the upper address electrodes 124 enables several reliability improvements to the micromirror device. First, the elimination of the upper address electrodes 124 eliminates the possibility of debris in the micromirror package wedging between the torsion hinge yoke 114 and the upper address electrode 124. Debris wedging between the torsion hinge yoke 114 and the upper address electrode 124 may electrically short circuit the device as well as mechanically obstruct movement of the mirror.

Elimination of the upper address electrodes 124 enables the use of relaxed design rules which result in larger gaps between various elements of the micromirror structure. These larger gaps, in addition to being less susceptible to shorting debris, reduce the likelihood of a poor etch process leaving metal filaments that extend across gaps between structural elements. Thus, the elimination of the upper address electrodes 124 increases fabrication yields by increasing the tolerance of the device to variations in the fabrication processes.

Elimination of the upper address electrodes 124 also allows the use of a shorter mirror support spacervia 326 since the rotated mirror 102 no longer needs to avoid conflict with the upper address electrodes 124. The height of the mirror support spacervia 326 is controlled by the thickness of a second spacer layer 702, shown in FIG. 7, on which the mirror is deposited. Lowering the micromirror brings the micromirror closer to the torsion hinge axis and reduces the moment of inertia during the deflection of the micromirror. A lower moment of inertia leads to a shorter switching time between digital states, which is desirable in achieving the greatest number of gray levels.

A shorter mirror support spacervia 326 also provides less opportunity for light to get under the mirrors when the mirrors are tilted. Light that does get under the mirrors is scattered by the micromirror superstructure. Some of the light scattered by the micromirror superstructure eventually passes between the mirrors, enters the aperture of the projection lens, and reaches the image plane where it lowers the contrast ratio of the display system.

The shorter mirror support spacervia 326 also reduces the torque experienced by the mirror support spacervia 326. Additionally, for a given hole width, the use of a thinner second spacer layer 702 increases the metal step coverage on the sides of the spacervia hole. Because of the improved step coverage and reduced torque, the mirror support spacervia 326 can have a smaller width. A narrow mirror support spacervia 326 reduces the size of the hole in mirror 704, increasing the optically active mirror area and reducing the amount of light scattered by the hole in the mirror. As a result, both the efficiency and the contrast ratio of the display system are increased.

Figure 7:
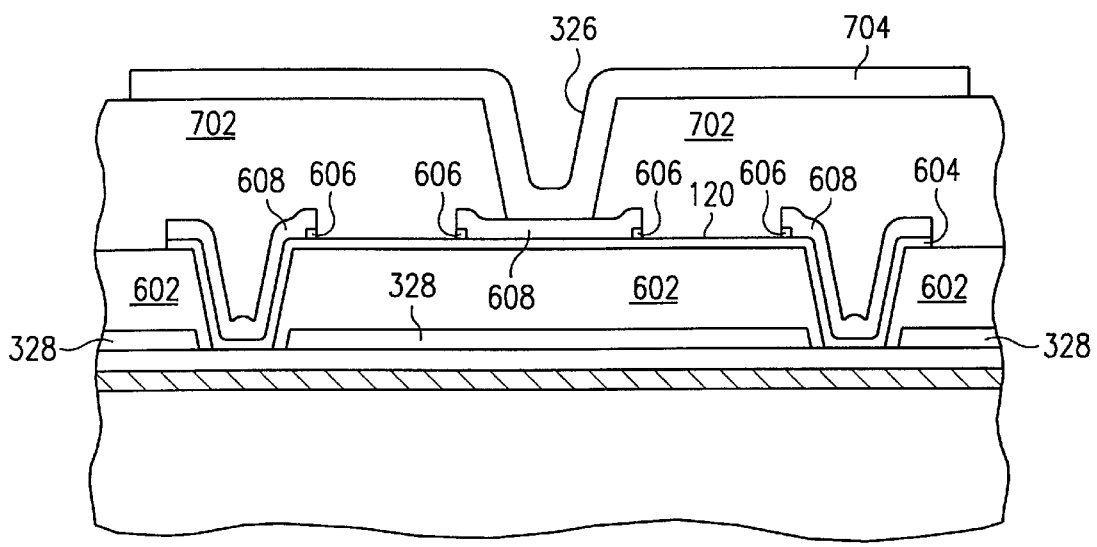
FIG. 7 is a cross-section view along the torsion hinge axis showing the element of FIG. 6 prior to etching away the sacrificial spacer layers.
Figure 8:
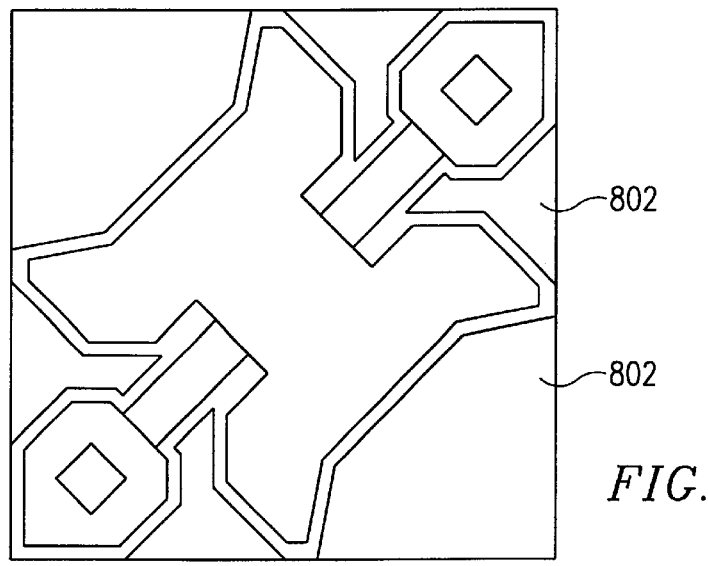
FIG. 8 is a top view of a partially completed micromirror element according to the present invention showing an inverse yoke region spacer.

Unfortunately, the large gaps between the torsion hinge yokes 114 and torsion hinge caps 122 coupled with the thinner second spacer layer 702 shown in FIG. 7, make it much more difficult to deposit a planar second spacer layer 702. An additional spacer layer is used to enable the second spacer layer 702 to create a planar surface on which to deposit the mirror metal layer. This additional spacer layer preferably is the combined thickness of the torsion hinge metal layer 604, the second metal layer 608, and any trench etched into the first spacer layer 602 when the torsion hinge 604 and torsion hinge yoke 608 layers and etch stops 606 are etched and removed. The second spacer layer 702 is patterned to form inverse yoke regions 802, shown in FIG. 8. The inverse yoke regions 802 shown in FIG. 8 are merely one example of shapes that provide a suitable surface on which to deposit a planarizing spacer layer 702.

After the additional spacer layer has been patterned to form inverse yoke regions 802 and deep UV hardened, the second spacer layer 702 is deposited as shown in FIG. 7. The second spacer layer is typically a 1.3 $\mu$m thick layer of positive photoresist which is patterned to create a form in which a mirror support spacervia 326 is deposited. After the second spacer layer has been deposited and patterned, a mirror metal layer 704 is deposited and patterned to form the mirrors. The mirror metal layer 704 is typically a 3000 Å thick layer of an aluminum alloy. Once the mirror metal layer 704 is patterned, the first and second spacer layers, as well as the inverse yoke layer are etched away, allowing the completed micromirror superstructure to deflect about the axis of the torsion hinge 120.

The micromirror architecture described above provides many advantages over prior architectures. A primary advantage is a large increase in fabrication yield. This higher yield is also locked-in: micromirror superstructure fabrication processes will not create faults in earlier layers since the dielectric isolation layer physically blocks access to the earlier layers. This physical barrier also simplifies failure analysis since one fault will not start a chain reaction of secondary faults.

The new architecture is much more tolerant of debris than prior designs. Conductive debris cannot cause short circuits since the only exposed structures are all operating at the mirror bias/reset voltage. Debris is much less likely to cause mechanical obstructions since the new architecture provides larger gaps between the deflectable rigid structure and the stationary support structure.

One potentially negative side-effect of the new architecture is the potential for the dielectric isolation layer to develop a surface charge. A surface charge is generated when ionizing radiation passes through the air gap beneath each mirror. The ionizing radiation, which may be cosmic rays or alpha particles from the package, strikes the air gap between the mirror and the address electrodes creating positive ions and electrons which are separated by the voltage field used to address the mirror. During periods in which the position of the mirror is held constant this resulting charge may become large enough to significantly reduce the applied electric field and interfere with the ability of the address electrodes to tilt the mirror reliably. Two solutions exist that prevent the dielectric isolation layer from charging. The first solution is to periodically reverse the sign of the applied electrostatic field across the air gap.

This technique, often called AC addressing, switches the polarity of the image data stored in a memory cell used to drive the address electrodes, and also the polarity of the mirror bias and reset voltage. This technique is often used in liquid crystal displays to prevent the migration of ionic contaminants through the liquid. Changing the polarity of the image data changes an address electrode voltage from logic high to logic low, and vice versa. If the polarity of the mirror bias voltage is reversed at the same time, the mirror will rotate the same direction as it did before the address and bias voltages were altered. The duration of each polarity must be short enough to prevent significant surface charges from building up. Typically the polarity is reversed each frame.

A second solution to the surface charge problem also prevents a surface charge from forming. The surface charge is formed when gas inside the package chamber, typically nitrogen, is ionized. When ionized, nitrogen creates an electron and a positively charged nitrogen molecule. Since the electron has such a low mass, it is accelerated toward the dielectric layer by the voltage field and often reaches the dielectric layer before it recombines. Filling the micromirror device package with a gas having a large dissociative electron capture cross section, such as $SF_6$, results in ionization products which typically recombine before reaching the dielectric layer.

Figure 9:
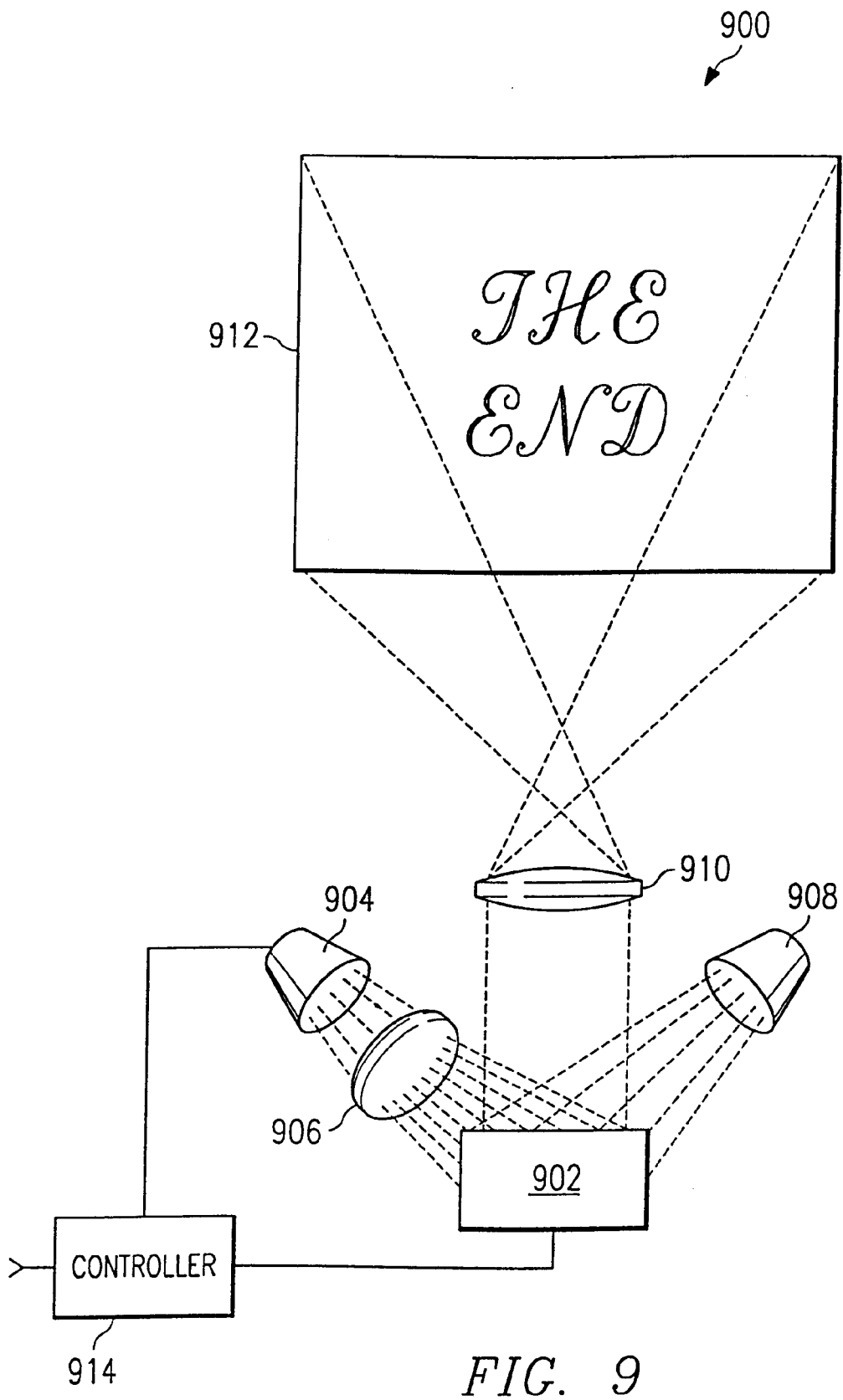
FIG. 9 is a schematic view of a micromirror-based projection system utilizing an improved micromirror device according to one embodiment of the present invention.

FIG. 9 is a schematic view of an image projection system 900 using an improved micromirror 902 according to the present invention. In FIG. 9, light from light source 904 is focused on the improved micromirror 902 by lens 906. Although shown as a single lens, lens 906 is typically a group of lenses and mirrors which together focus and direct light from the light source 904 onto the surface of the micromirror device 902. Image data and control signals from controller 914 cause some mirrors to rotate to an on position and others to rotate to an off position. Mirrors on the micromirror device that are rotated to an off position reflect light to a light trap 908 while mirrors rotated to an on position reflect light to projection lens 910, which is shown as a single lens for simplicity. Projection lens 910 focuses the light modulated by the micromirror device 902 onto an image plane or screen 912.

Thus, although there has been disclosed to this point a particular embodiment for an improved micromirror and process of manufacture thereof, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A micromirror device comprising:
   a substrate;
   at least one address electrode supported by said substrate;
   a mirror bias/reset conductor supported by said substrate;
   a dielectric layer overlying said at least one address electrode;
   a deformable element supported over said dielectric layer; and
   a deflectable rigid member supported by said deformable element, wherein a voltage differential between said at least one address electrode and said rigid member is operable to create an electrostatic attraction between said at least one address electrode and said rigid member and to cause said deflectable rigid member to deflect toward said at least one address electrode.

2. The micromirror device of claim 1, wherein said rigid member is a hinge yoke.

3. The micromirror device of claim 1, wherein said rigid member is a mirror.

4. The micromirror device of claim 1, wherein said deformable element is a torsion hinge.

5. The micromirror device of claim 1, wherein said deformable element is a cantilever hinge.

6. The micromirror device of claim 1, said dielectric layer further overlying said mirror bias/reset conductor.

7. The micromirror device of claim 1, said dielectric layer further overlying said mirror bias/reset conductor, wherein portions of said dielectric layer are removed to allow said deflectable rigid member to contact said mirror bias/reset conductor.

8. A method of forming a micromirror device, said method comprising the steps of:
   forming a mirror bias/reset conductor and address electrodes on a substrate;
   forming a dielectric layer over said address electrodes; and
   forming a deflectable rigid member supported by said substrate.

9. The method of claim 8, wherein said step of forming a deflectable rigid member comprises the step of forming a mirror.

10. The method of claim 8, wherein said step of forming a deflectable rigid member comprises the step of forming a hinge yoke.

11. The method of claim 8, wherein said step of forming a deflectable rigid member comprises the step of forming a mirror and a torsion hinge yoke.

12. The method of claim 8, wherein said step of forming a dielectric layer over said address electrodes comprises forming a dielectric layer over said address electrodes and said mirror bias/reset conductor.

13. The method of claim 8, further comprising the step of forming a deformable member supported by said substrate, said deflectable rigid member connected to and supported by said deformable member.

14. The method of claim 13, wherein said step of forming a deformable member comprises the step of forming a torsion hinge.

15. The method of claim 13, wherein said step of forming a deformable member comprises the step of forming a cantilever hinge.

16. The method of claim 8, further comprising the steps of:
   depositing a spacer layer over said address electrodes and said mirror bias/reset conductor;
   opening vias in said spacer layer;
   depositing a metal in said vias; and
   patterning said metal to form at least one support structure, said at least one support structure supporting said deflectable rigid member above said substrate.

17. The method of claim 16, further comprising the step of:
   removing at least part of said spacer layer.

18. A method of forming a micromirror device, said method comprising the steps of:
   forming a mirror bias/reset conductor and address electrodes on a substrate;
   forming a dielectric layer over said address electrodes; and
   forming a deflectable rigid member supported by said substrate by:
      depositing a first spacer layer;
      depositing at least one metal layer on said first spacer layer;
      patterning said at least one metal layer to form said support structures, a deformable element, and a hinge yoke;
      forming a second spacer layer over portions of said first spacer layer not covered by said support structures, said deformable element, and said hinge yoke;

depositing a third spacer layer over said second spacer layer, said support structures, said deformable element, and said hinge yoke;

opening vias through said third spacer layer to said hinge yoke; and forming micromirrors on said third spacer layer.

19. The method of claim 18 wherein said step of forming a second spacer layer comprises the step of forming a second spacer layer over said deformable element.

20. The method of claim 18 wherein said step of depositing a third spacer layer comprises the step of depositing a planarizing third spacer layer.

21. A micromirror device comprising:

a substrate;

a first layer supported by said substrate;

a second layer spaced apart from said first layer, said second layer forming a micromirror; and a third layer disposed between and spaced apart from said first layer and said second layer, said third layer supported by said substrate and supporting said second layer, said third layer comprising at least one deformable element and at least one hinge yoke, wherein address electrodes are formed only in said first layer.

22. The micromirror device of claim 21 further comprising a dielectric layer disposed on said address electrodes.

23. A method of forming a micromirror device, said method comprising the steps of:

forming a mirror bias/reset conductor and address electrodes on a substrate;

forming a dielectric layer over said address electrodes;

forming a hinge yoke supported above said address electrodes; and forming a micromirror supported by said hinge yoke.

24. The method of claim 23, further comprising the step of forming a dielectric layer over said address electrodes and said mirror bias/reset conductor.

25. The method of claim 23, further comprising the step of forming a deformable member supported by said substrate, said hinge yoke connected to and supported by said deformable member.

26. The method of claim 25, wherein said step of forming a deformable member comprises the step of forming a torsion hinge.

27. The method of claim 25, wherein said step of forming a deformable member comprises the step of forming a cantilever hinge.

28. The method of claim 23, further comprising the steps of:

depositing a spacer layer over said address electrodes and said mirror bias/reset conductor;

opening vias in said spacer layer;

depositing a metal in said vias; and patterning said metal to form said at least one support structure, said at least one support structure supporting said micromirror above said substrate.

29. The method of claim 28, further comprising the step of:

removing at least part of said spacer layer.

30. The method of claim 23, said step of forming a micromirror comprising the steps of:

depositing an inverse spacer layer, said inverse spacer layer patterned to avoid said hinge yoke;

depositing a spacer layer over said inverse spacer layer and said hinge yoke;

opening vias through said spacer layer to said hinge yoke; and forming micromirrors on said spacer layer.

* * * * *